United States Patent
Chiba et al.

(10) Patent No.: US 10,949,755 B2
(45) Date of Patent: Mar. 16, 2021

(54) PREDICTION RESULT DISPLAY SYSTEM, PREDICTION RESULT DISPLAY METHOD, AND PREDICTION RESULT DISPLAY PROGRAM

(71) Applicant: NEC Corporation, Tokyo (JP)

(72) Inventors: Yuki Chiba, Tokyo (JP); Yousuke Motohashi, Tokyo (JP); Ryohei Fujimaki, Sunnyvale, CA (US); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 883 days.

(21) Appl. No.: 15/544,309

(22) PCT Filed: Jan. 18, 2016

(86) PCT No.: PCT/JP2016/000225
§ 371 (c)(1),
(2) Date: Jul. 18, 2017

(87) PCT Pub. No.: WO2016/121328
PCT Pub. Date: Aug. 4, 2016

(65) Prior Publication Data
US 2018/0012128 A1    Jan. 11, 2018

Related U.S. Application Data
(60) Provisional application No. 62/108,618, filed on Jan. 28, 2015.

(51) Int. Cl.
*G06N 5/02* (2006.01)
*G06N 20/00* (2019.01)
*G06N 5/04* (2006.01)

(52) U.S. Cl.
CPC ............. *G06N 5/022* (2013.01); *G06N 5/045* (2013.01); *G06N 20/00* (2019.01)

(58) Field of Classification Search
CPC ....................................................... G06N 5/02
See application file for complete search history.

(56) References Cited

U.S. PATENT DOCUMENTS

2014/0310228 A1    10/2014    Nakabayashi et al.

FOREIGN PATENT DOCUMENTS

| JP | H07-36849 A | 2/1995 |
| JP | 2004-157814 A | 6/2004 |

(Continued)

OTHER PUBLICATIONS

AstroML, "3D Plotting", 2012, pp. 1-3. URL: https://jakevdp.github.io/mpl_tutorial/tutorial_pages/tut5.html (Year: 2012).*

(Continued)

*Primary Examiner* — Paulinho E Smith

(57) ABSTRACT

An apparatus that extracts an explanatory variable used as a condition from a classification model classified by the condition for selecting a component used for prediction, displays the explanatory variable in association with any of dimensional axes of a multi-dimensional space in which a prediction value is displayed, specifies the component that corresponds to a position in the multi-dimensional space specified by each of the explanatory variables associated with the dimensional axis, displays the prediction value calculated based on the specified component, on the same position and displays the multi-dimensional space that corresponds to the position in which the prediction value is displayed, in a mode that corresponds to the component used for calculating the prediction value.

11 Claims, 11 Drawing Sheets

(56) References Cited

FOREIGN PATENT DOCUMENTS

| JP | 2013-152656 A | 8/2013 |
|----|---------------|--------|
| JP | 2013-235566 A | 11/2013 |
| JP | 2014-206870 A | 10/2014 |

OTHER PUBLICATIONS

Suzuki et al., "A Scatterplot-based Visualization Tool for Regression Analysis", Sep. 2016, IEEE, pp. 75-80 (Year: 2016).*

Ippo susunda kikaigakushu IoT de gekizou-suru data no katsuyoogenba ni shintou [Penetration into field of usage of dramatically increasing data using machine learning IoT that has advanced one step], Nikkei Business Publications Inc., "Nikkei Big Data", 06 Nos. 2014, p. 7-12.

International Search Report for PCT Application No. PCT/JP2016/000225, dated Apr. 19, 2016.

* cited by examiner

FIG. 7

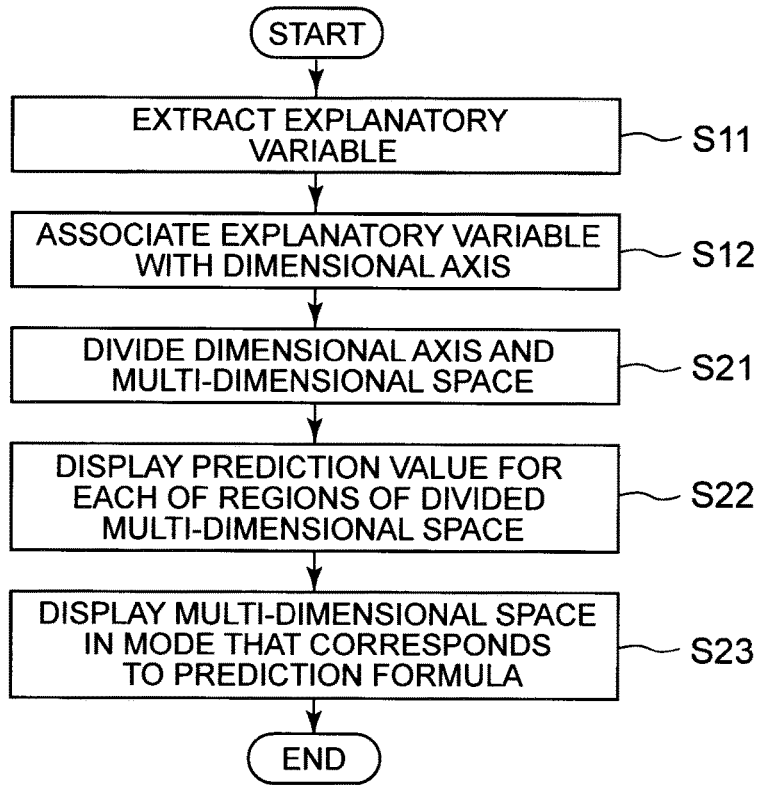

```
START
  ↓
EXTRACT EXPLANATORY VARIABLE — S11
  ↓
ASSOCIATE EXPLANATORY VARIABLE WITH DIMENSIONAL AXIS — S12
  ↓
DIVIDE DIMENSIONAL AXIS AND MULTI-DIMENSIONAL SPACE — S21
  ↓
DISPLAY PREDICTION VALUE FOR EACH OF REGIONS OF DIVIDED MULTI-DIMENSIONAL SPACE — S22
  ↓
DISPLAY MULTI-DIMENSIONAL SPACE IN MODE THAT CORRESPONDS TO PREDICTION FORMULA — S23
  ↓
END
```

FIG. 8

| OBJECTIVE VARIABLE | EXPLANATORY VARIABLE | | | | | |
|---|---|---|---|---|---|---|
| HARDNESS/ TOUGHNESS (10 LEVELS) | DOUGH REST TIME (hour) | BAKING TEMPERATURE (°C) | BAKING TIME (min) | INGREDIENT RATIO 1 (SUGAR/ FLOUR) | INGREDIENT RATIO 2 (BUTTER/ FLOUR) | INGREDIENT RATIO 3 (EGG/ FLOUR) |
| 5 | 2 | 170 | 12 | 0.3 | ... | ... |
| 4 | 1.5 | 170 | 10 | 0.5 | ... | ... |
| 6 | 2 | 200 | 11 | 0.4 | ... | ... |
| 8 | 0.5 | 155 | 10 | 0.4 | ... | ... |
| 2 | 5 | 160 | 11 | 0.7 | ... | ... |
| 7 | 0.5 | 200 | 9 | 0.3 | ... | ... |

FIG. 9

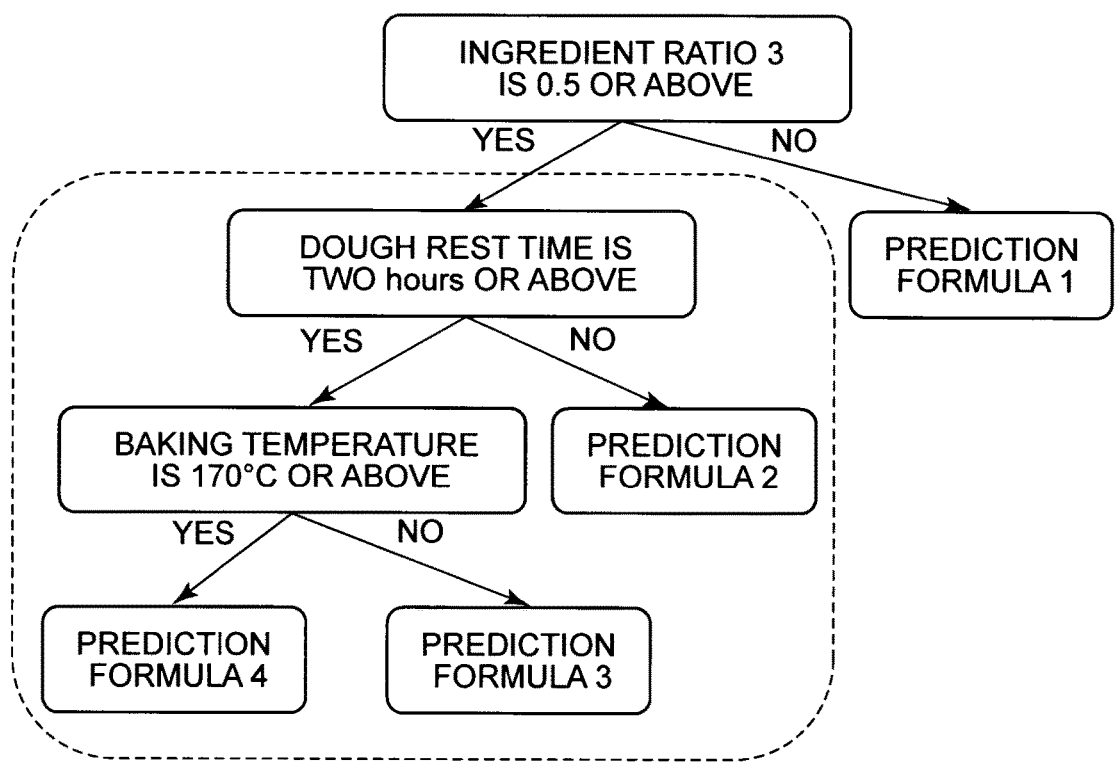

- HARDNESS PREDICTION FORMULA 1: HARDNESS = 2.0 × BAKING TIME + 0.3 × INGREDIENT RATIO 1 + 1.2 × INGREDIENT RATIO 2 + CONSTANT 1
- HARDNESS PREDICTION FORMULA 2: HARDNESS = 0.3 × BAKING TIME + 3.0 × DOUGH REST TIME + 2.5 × INGREDIENT RATIO 1 + CONSTANT 2
- HARDNESS PREDICTION FORMULA 3: HARDNESS = 0.5 × INGREDIENT RATIO 2 + 2.5 × INGREDIENT RATIO 3 + CONSTANT 3
- HARDNESS PREDICTION FORMULA 4: HARDNESS = 5.0 × BAKING TEMPERATURE + 0.3 × INGREDIENT RATIO 2 + CONSTANT 4

FIG. 10

| | | BAKING TEMPERATURE | | | | | | |
| --- | --- | --- | --- | --- | --- | --- | --- | --- |
| | | 150-160°C | 160-170°C | 170-180°C | 180-190°C | 190-200°C | 200-210°C | 210-220°C |
| DOUGH REST TIME | 0-1hour | | | | | | | |
| | 1-2hour | | | | | | | |
| | 2-3hour | | | | | | | |
| | 3-4hour | | | | | | | |
| | 4-5hour | | | | | | | |
| | 5-6hour | | | | | | | |

FIG. 11

| | | BAKING TEMPERATURE | | | | | | |
| --- | --- | --- | --- | --- | --- | --- | --- | --- |
| | | 150-160°C | 160-170°C | 170-180°C | 180-190°C | 190-200°C | 200-210°C | 210-220°C |
| DOUGH REST TIME | 0-1hour | _8_ | 7 | 6 | 6 | 7 | _7_ | 8 |
| | 1-2hour | 8 | 6 | _4_ | 5 | 7 | 7 | 8 |
| | 2-3hour | 6 | _6_ | _5_ | _4_ | 5 | _6_ | 8 |
| | 3-4hour | _3_ | 3 | 5 | 5 | 5 | 7 | 8 |
| | 4-5hour | 1 | 1 | 6 | _5_ | 6 | 7 | 8 |
| | 5-6hour | 1 | _2_ | 6 | 6 | 7 | 8 | _8_ |

FIG. 12
| | | BAKING TEMPERATURE | | | | | | |
|---|---|---|---|---|---|---|---|---|
| | | 150-160°C | 160-170°C | 170-180°C | 180-190°C | 190-200°C | 200-210°C | 210-220°C |
| DOUGH REST TIME | 0-1hour | 8 | 7 | 6 | 6 | 7 | 7 | 8 |
| | 1-2hour | 8 | 6 | 4 | 5 | 7 | 7 | 8 |
| | 2-3hour | 6 | 6 | 5 | 4 | 5 | 6 | 8 |
| | 3-4hour | 3 | 3 | 5 | 5 | 5 | 7 | 8 |
| | 4-5hour | 1 | 1 | 6 | 5 | 6 | 7 | 8 |
| | 5-6hour | 1 | 2 | 6 | 6 | 7 | 8 | 8 |
 PREDICTION FORMULA 1
 PREDICTION FORMULA 2
 PREDICTION FORMULA 3
 PREDICTION FORMULA 4
FIG. 13
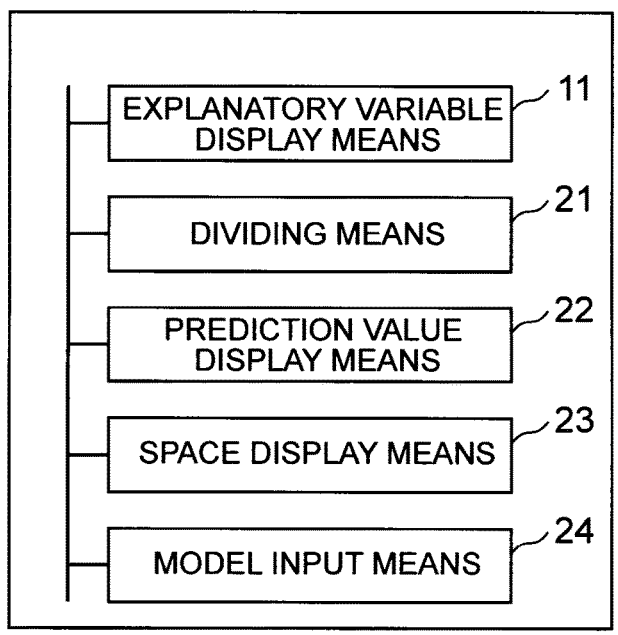

FIG. 14

| | | BAKING TEMPERATURE | | | | | | |
|---|---|---|---|---|---|---|---|---|
| | | 150-160°C | 160-170°C | 170-180°C | 180-190°C | 190-200°C | 200-210°C | 210-220°C |
| DOUGH REST TIME | 0-1hour | 9 | 9 | 8 | 8 | 7 | 6 | 4 |
| | 1-2hour | 8 | 8 | 7 | 7 | 8 | 8 | 3 |
| | 2-3hour | 2 | 3 | 7 | 7 | 5 | 6 | 3 |
| | 3-4hour | 3 | 2 | 7 | 6 | 5 | 6 | 2 |
| | 4-5hour | 2 | 2 | 7 | 6 | 7 | 8 | 3 |
| | 5-6hour | 1 | 1 | 7 | 7 | 7 | 8 | 3 |

▨ PREDICTION FORMULA 5
▦ PREDICTION FORMULA 6
▨ PREDICTION FORMULA 7
▩ PREDICTION FORMULA 8

FIG. 15
| | | BAKING TEMPERATURE | | | | | | |
|---|---|---|---|---|---|---|---|---|
| | | 150-160°C | 160-170°C | 170-180°C | 180-190°C | 190-200°C | 200-210°C | 210-220°C |
| DOUGH REST TIME | 0-1hour | 9 | 9 | 8 | 8 | 7 | 6 | 4 |
| | 1-2hour | 8 | 8 | 7 | 7 | 8 | 8 | 3 |
| | 2-3hour | 2 | 3 | 7 | 7 | 5 | 6 | 3 |
| | 3-4hour | 3 | 2 | 7 | 6 | 5 | 6 | 2 |
| | 4-5hour | 2 | 2 | 7 | 6 | 7 | 8 | 3 |
| | 5-6hour | 1 | 1 | 7 | 7 | 7 | 8 | 3 |
 PREDICTION FORMULA 5
 PREDICTION FORMULA 6
 PREDICTION FORMULA 7
 PREDICTION FORMULA 8
FIG. 16
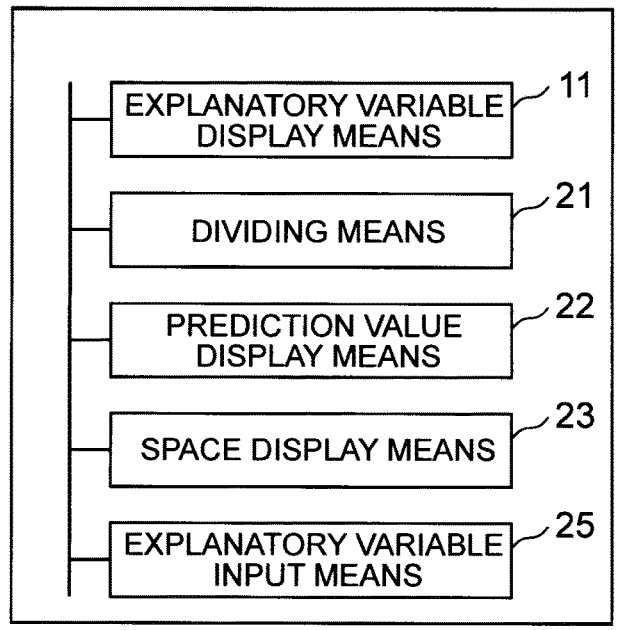

FIG. 17
| | BAKING TEMPERATURE | | | | | | |
|---|---|---|---|---|---|---|---|
| | 150-160°C | 160-170°C | 170-180°C | 180-190°C | 190-200°C | 200-210°C | 210-220°C |
| DOUGH REST TIME 0-1hour | 8 | 7 | 6 | 6 | 7 | 7 | 8 |
| 1-2hour | 8 | 6 | 4 | 5 | 7 | 7 | 8 |
| 2-3hour | 6 | 6 | 5 | 4 | 5 | 6 | 8 |
| 3-4hour | 3 | 3 | 5 | 5 | 5 | 7 | 8 |
| 4-5hour | 1 | 1 | 6 | 5 | 6 | 7 | 8 |
| 5-6hour | 1 | 2 | 6 | 6 | 7 | 8 | 8 |
 PREDICTION FORMULA 1
 PREDICTION FORMULA 2
 PREDICTION FORMULA 3
PREDICTION FORMULA 4
EXPLANATORY VARIABLE
BAKING TIME (min)  10
INGREDIENT RATIO 1 (SUGAR/FLOUR)  0.5
INGREDIENT RATIO 2 (BUTTER/FLOUR)  ...
INGREDIENT RATIO 3 (EGG/FLOUR)  ...
50　52　51

PREDICTION RESULT DISPLAY SYSTEM, PREDICTION RESULT DISPLAY METHOD, AND PREDICTION RESULT DISPLAY PROGRAM

This application is a National Stage Entry of PCT/JP2016/000225 filed on Jan. 18, 2016, which claims priority from U.S. Patent Application 62/108,618 filed on Jan. 28, 2015, the contents of all of which are incorporated herein by reference, in their entirety.

TECHNICAL FIELD

The present invention relates to a prediction result display system to display a prediction result, a prediction result display method, and a prediction result display program.

BACKGROUND ART

A product development process includes a development condition in which a designer determines a plurality of setting values (parameter) assumable at the time of production on the basis of experience, or the like, and repeats setting value adjustment until the values reach their target performance values by performing prototyping and tests. Moreover, in a field of machine learning, a performance value is predicted using a plurality of pieces of measurement data as the learning data.

Meanwhile, NPL 1 describes automatic selection of a prediction formula from among a plurality of prediction formulas and calculation of a prediction value using the selected prediction formula. Moreover, NPL 1 also describes displaying a graph representing transition of the calculated prediction value and transition of an actual performance value that corresponds to the prediction value. Furthermore, NPL 1 describes a graph representing the transition of the selected prediction formula.

CITATION LIST

Non-Patent Literature

NPL 1: "Ippo susunda kikaigakushu IoT de gekizou-suru data no katsuyoogenba ni shintou [Penetration into field of usage of dramatically increasing data using machine learning IoT that has advanced one step]", Nikkei Business Publications Inc., "Nikkei Big Data", 06 Nos. 2014, p. 7-12

SUMMARY OF INVENTION

Technical Problem

Meanwhile, there are many cases in which the trend indicated by the performance value changes depending on the parameter value to be set. In this case, also the prediction formula indicating the trend of each of the performance values is considered to change depending on the parameter value. Accordingly, it would be preferable that a human can intuitively recognize at a glance the transition of the prediction value even when the parameter value to be set has been changed.

Moreover, in a display method described in NPL 1, the prediction formula to be utilized and a prediction result when the prediction formula is used are visualized in accordance with the chronological change. On the other hand, there is a strong desire, on production development, to grasp the trend of the performance value changing with the parameter setting. Therefore, it is preferable to have a capability of visualizing the trend of the prediction value corresponding to the parameter to be set.

Accordingly, the present invention is intended to provide a prediction result display system to display a prediction result, a prediction result display method, and a prediction result display program, capable of visualizing the trend of a prediction result corresponding to the parameter to be set.

Solution to Problem

A prediction result display system according to the present invention is used in a prediction system configured to calculate a prediction value by applying input data to a component. The prediction result display system includes an explanatory variable display means, a prediction value display means, and a space display means. The explanatory variable display means extracts an explanatory variable used as a condition from a classification model classified by the condition for selecting the component used for prediction and displays the explanatory variable in association with any of dimensional axes of a multi-dimensional space in which the prediction value is displayed. The prediction value display means specifies the component that corresponds to a position in a multi-dimensional space specified by each of the explanatory variables associated with the dimensional axis and displays the prediction value calculated on the basis of the specified component, on the same position. The space display means displays the multi-dimensional space that corresponds to the position in which the prediction value is displayed, in a mode that corresponds to the component used for calculating the prediction value.

A prediction result display method according to the present invention is used in a prediction system configured to calculate a prediction value by applying input data to a component. The prediction result display method includes: extracting an explanatory variable used as a condition from a classification model classified by the condition for selecting the component used for prediction, and displaying the explanatory variable in association with any of dimensional axes of a multi-dimensional space in which the prediction value is displayed; specifying the component that corresponds to a position in a multi-dimensional space specified by each of the explanatory variables associated with the dimensional axis, and displaying a prediction value calculated on the basis of the specified component, on the same position; and displaying the multi-dimensional space that corresponds to the position in which the prediction value is displayed, in a mode that corresponds to the component used for calculating the prediction value.

A prediction result display program according to the present invention causes a computer to execute explanatory variable display processing, prediction value display processing, and space display processing. The explanatory variable display processing extracts an explanatory variable used as a condition from a classification model classified by the condition for selecting the component used for prediction and displays the explanatory variable in association with any of dimensional axes of a multi-dimensional space in which the prediction value is displayed. The prediction value display processing specifies the component that corresponds to a position in a multi-dimensional space specified by each of the explanatory variables associated with the dimensional axis, calculates the prediction value by applying each of the explanatory variables to the specified component, and displays the calculated prediction value, on the same position. The space display processing displays the multi-dimensional space that corresponds to the position in which the prediction value is displayed, in a mode that corresponds to the component used for calculating the prediction value.

Advantageous Effects of Invention

According to the present invention, it is possible to visualize the trend of a prediction result corresponding to the parameter to be set.

BRIEF DESCRIPTION OF DRAWINGS

FIG. 7 It depicts a flowchart illustrating exemplary operation of the prediction result display system according to the second exemplary embodiment.

FIG. 8 It depicts a diagram illustrating exemplary learning data.

FIG. 9 It depicts a diagram illustrating an exemplary classification model.

FIG. 10 It depicts a diagram illustrating an exemplary division of a table by allocating an explanatory variable to each of axes.

FIG. 11 It depicts a diagram illustrating an exemplary display of a prediction value and a measurement value in each of regions.

FIG. 12 It depicts a diagram illustrating an exemplary display of a multi-dimensional space in accordance with a prediction formula.

FIG. 13 It depicts a block diagram illustrating an exemplary configuration of a prediction result display system according to a third exemplary embodiment of the present invention.

FIG. 14 It depicts a diagram illustrating another exemplary display of a multi-dimensional space in accordance with a prediction formula.

FIG. 15 It depicts a diagram illustrating an exemplary parameter adjustment in consideration of a change in the performance value.

FIG. 16 It depicts a block diagram illustrating an exemplary configuration of a prediction result display system according to a fourth exemplary embodiment of the present invention.

FIG. 17 It depicts a block diagram illustrating an exemplary screen for inputting an explanatory variable value.

DESCRIPTION OF EMBODIMENTS

Hereinafter, exemplary embodiments of the present invention will be described with reference to the drawings.

First Exemplary Embodiment

Figure 1:
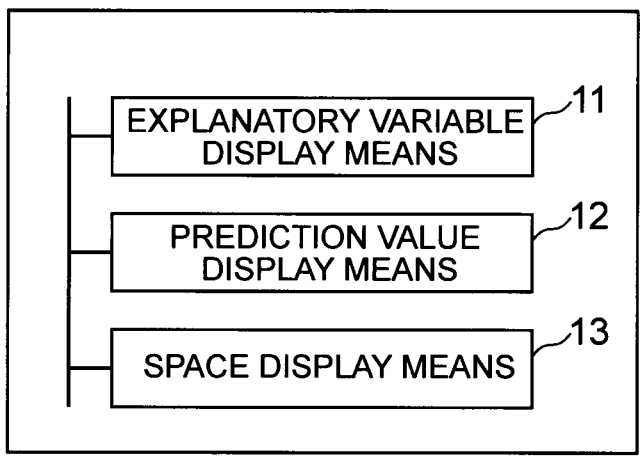
FIG. 1 It depicts a block diagram illustrating an exemplary configuration of a prediction result display system according to a first exemplary embodiment of the present invention.

FIG. 1 is a block diagram illustrating an exemplary configuration of a prediction result display system according to a first exemplary embodiment of the present invention. The prediction result display system according to the present exemplary embodiment includes an explanatory variable display means 11, a prediction value display means 12, and a space display means 13.

The prediction result display system according to the present invention calculates a prediction value by applying input data to a component and displays the prediction value on a multi-dimensional space, as a prediction result. In the present exemplary embodiment, a prediction formula as a component used for prediction of the input data is selected in accordance with the content of the input data, and prediction is performed using the selected prediction formula.

That is, since the prediction formula is selected in accordance with the content of the input data, it is possible to classify a plurality of prediction formulas in accordance with the content of the input data. The model classified by conditions for selecting the prediction formula used for prediction can be referred to as a classification model. In the prediction formula according to the present exemplary embodiment, an objective variable calculated as a prediction value is represented by a linear sum of an explanatory variable. That is, the explanatory variable is used as a classification condition for the classification model.

The explanatory variable display means 11 extracts the explanatory variable from the classification model. As described above, this explanatory variable is used as a condition for selecting the component (prediction formula) used for prediction. The explanatory variable in the present exemplary embodiment corresponds to various parameters in production development, for example.

Extraction of the explanatory variable may be performed by any method. The explanatory variable display means 11 may select the explanatory variable on the basis of user's instruction, for example. Moreover, the explanatory variable display means 11 may extract the explanatory variable in the order from the explanatory variable used in the classification condition positioned in a higher order, or may extract the explanatory variable in the order from the explanatory variable with a larger coefficient with reference to the prediction formula represented by the linear sum. The explanatory variable display means 11 extracts the explanatory variable of the number of dimensions of the multi-dimensional space in which a prediction result is displayed, or less.

Next, the explanatory variable display means 11 displays the extracted explanatory variable in association with each of mutually different dimensional axes of the multi-dimensional space in which the prediction value is displayed. The explanatory variable display means 11 may associate the objective variable with any of the dimensional axes, with which the explanatory variable has not been associated. In this manner, by associating the explanatory variable with each of the dimensional axes, each of the positions in the multi-dimensional space is specified by the explanatory variable value.

The prediction value display means 12 specifies a prediction formula that corresponds to the position in the multi-dimensional space specified by each of the explanatory variables associated with the dimensional axis, and then, calculates the prediction value on the basis of the specified prediction formula. Note that the prediction formula also includes an explanatory variable other than the explanatory variable associated with the multi-dimensional space, and this explanatory variable is used for specifying the prediction formula and for calculating the prediction value. The prediction value display means 12 may set the explanatory variable value other than the extracted explanatory variable as a fixed value and may specify the prediction formula and calculate the prediction value using the fixed value.

Subsequently, the prediction value display means 12 displays the calculated prediction value at a corresponding position in the multi-dimensional space. Note that, in the case where explanatory variables are allocated to all the dimensional axes, displaying the prediction value means that the prediction value is displayed in the corresponding multi-dimensional space. Moreover, in a case where the objective variable is allocated to any of the dimensional axes, displaying the prediction value means plotting the prediction value at least at a position that corresponds to the dimensional axis of the objective variable.

Figure 2:
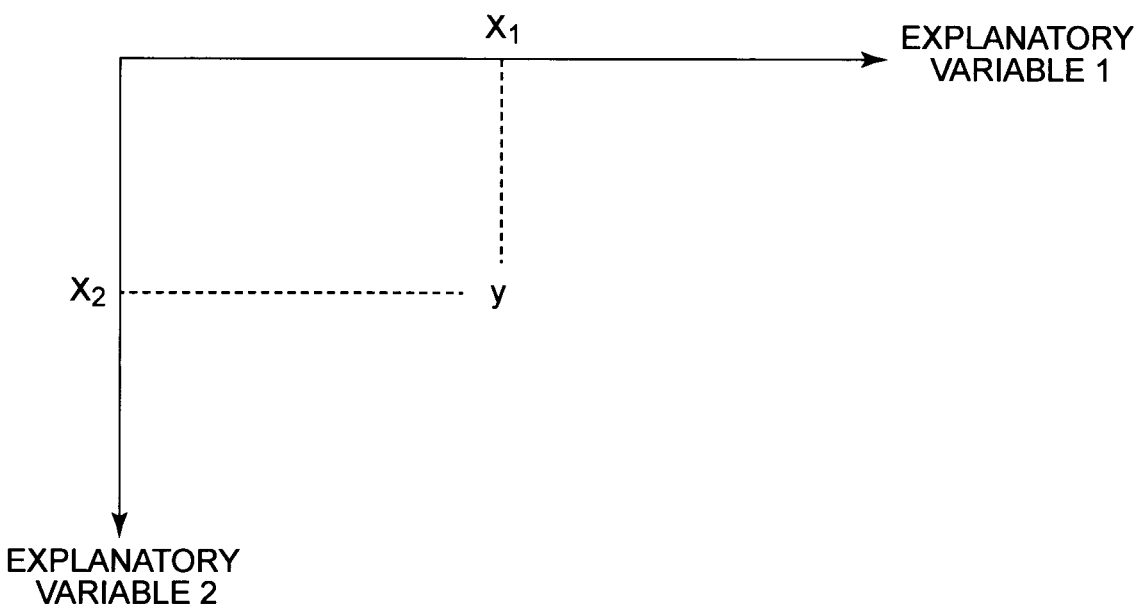
FIG. 2 It depicts a diagram illustrating an exemplary method for displaying a prediction value.

FIG. 2 is a diagram illustrating an exemplary method for displaying a prediction value. In an example of FIG. 2, the explanatory variable is allocated to two dimensional axes in a two-dimensional space. In this case, the prediction value display means 12 specifies a prediction formula to be applied to a case of an explanatory variable $x_1$ and an explanatory variable $x_2$. Subsequently, the prediction value display means 12 calculates an objective variable y by applying the explanatory variable $x_1$, and the explanatory variable $x_2$, to the prediction formula. The prediction value display means 12 displays the calculated prediction value (objective variable y) at a position in the two-dimensional space, specified by the explanatory variable $x_1$ and the explanatory variable $x_2$.

In this manner, the prediction value display means 12 visualizes the prediction result. While one prediction value is displayed in the example illustrated in FIG. 2, the number of displayed prediction values is not limited to one. The prediction value display means 12 may display any number of prediction values in the multi-dimensional space.

Figure 3:
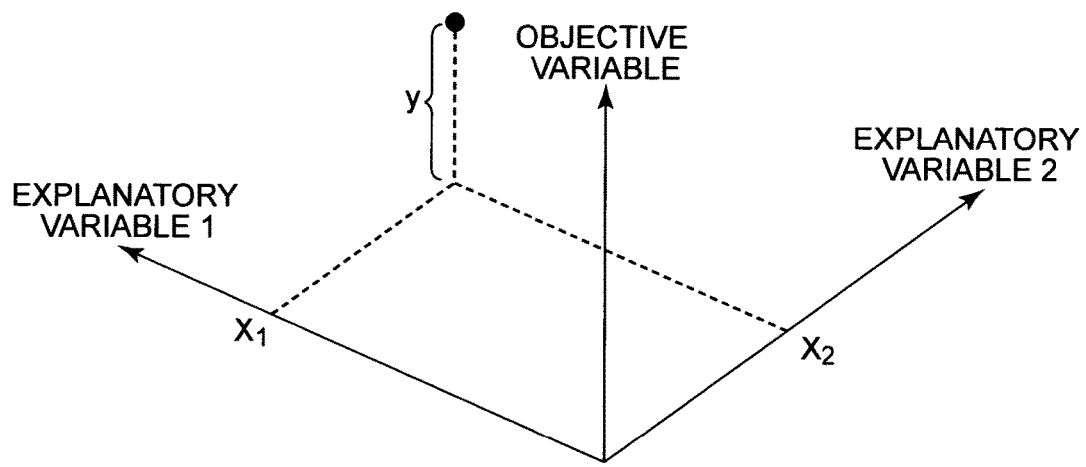
FIG. 3 It depicts a diagram illustrating another exemplary method for displaying the prediction value.

Moreover, FIG. 3 is a diagram illustrating another exemplary method for displaying the prediction value. In the example illustrated in FIG. 3, the explanatory variable is allocated to two dimensional axes in the three-dimensional space, and the objective variable is allocated to the remaining one dimensional axis. In this case, similarly to the case illustrated in FIG. 2, the prediction value display means 12 specifies the component to be applied to the case of the explanatory variable $x_1$, and the explanatory variable $x_2$. Subsequently, the prediction value display means 12 calculates an objective variable y by applying the explanatory variable $x_1$, and the explanatory variable $x_2$, to the prediction formula.

The prediction value display means 12 performs plotting at a position in the three-dimensional space specified by the explanatory variable $x_1$, the explanatory variable $x_2$, and the objective variable y. Even in this manner, the prediction value display means 12 can visualize the prediction result. While one point that corresponds to the prediction value is solely displayed in the example illustrated in FIG. 3, the number of points to be displayed is not limited to one. The prediction value display means 12 may display any number of points in the multi-dimensional space.

The space display means 13 displays the multi-dimensional space that corresponds to the position in which the prediction value is displayed, in a mode that corresponds to the component (prediction formula) used for calculating the prediction value. Note that displaying the multi-dimensional space not only includes setting of the region and the background of the multi-dimensional space but also includes changing the mode such as the plotted point.

The space display means 13 may determine beforehand a mode for displaying the region or the background of the multi-dimensional space for each of the components and may display the multi-dimensional space in accordance with the mode. Exemplary modes for displaying the region or the background of the multi-dimensional space include displaying in a difference color, density, lightness, pattern, or the like. The space display means 13 may pre-determine the modes (color, shape, brightness, etc.) of the point to be plotted for each of the components, and may display the multi-dimensional space in accordance with the mode.

Figure 4:
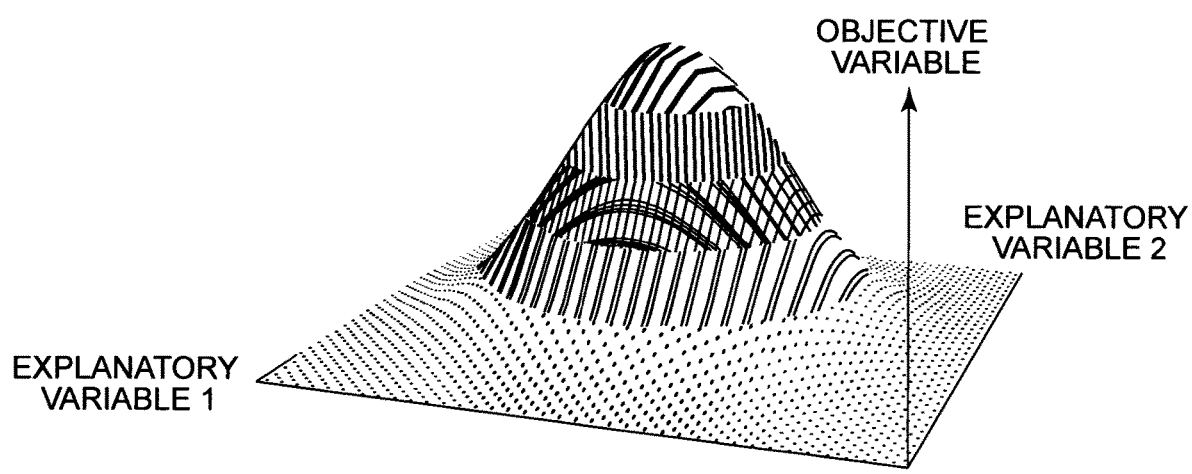
FIG. 4 It depicts a diagram illustrating an exemplary display of a plurality of prediction values in a three-dimensional space.

FIG. 4 is a diagram illustrating an exemplary display of a plurality of prediction values in a three-dimensional space. In a case where a plurality of prediction values is displayed as illustrated in FIG. 4, the space display means 13 may change the display mode for each of the prediction formulas used for calculating the prediction value.

The explanatory variable display means 11, the prediction value display means 12, and the space display means 13 are implemented by a CPU of the computer operating in accordance with a program (prediction result display program). For example, the program may be stored in a storage unit (not illustrated) included in the prediction result display system and the CPU may read the program and operate as the explanatory variable display means 11, the prediction value display means 12, and the space display means 13, in accordance with the program.

Moreover, each of the explanatory variable display means 11, the prediction value display means 12, and the space display means 13 may be implemented by dedicated hardware. Moreover, the prediction result display system according to the present invention may be configured with two or more physically separated devices connected by a wire or wirelessly with each other.

Figure 5:
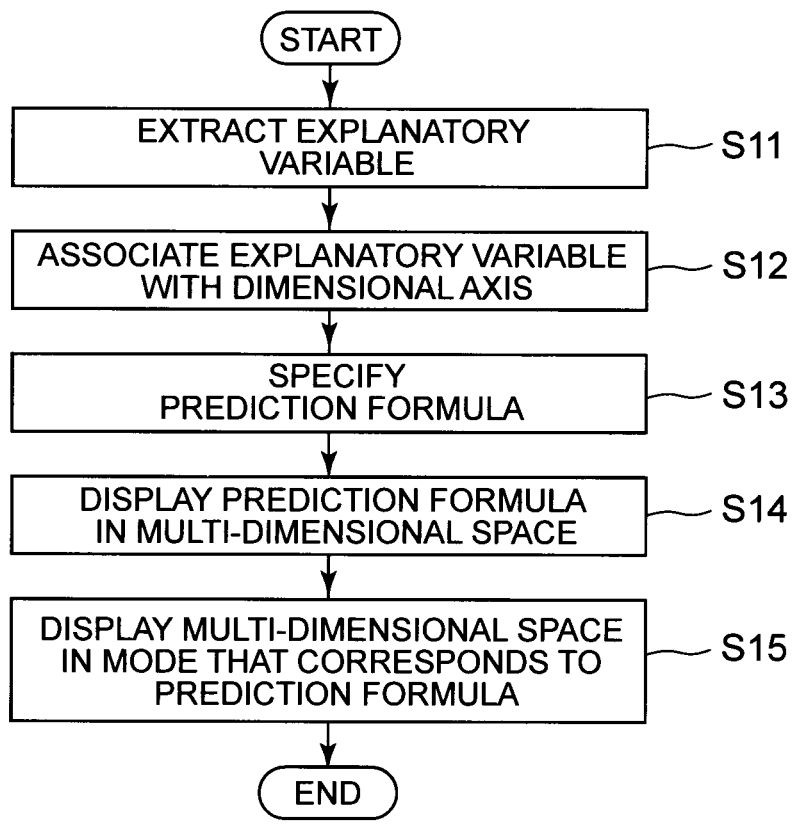
FIG. 5 It depicts a flowchart illustrating exemplary operation of the prediction result display system according to the first exemplary embodiment.

Next, operation of the prediction result display system according to the present exemplary embodiment will be described. FIG. 5 is a flowchart illustrating exemplary operation of the prediction result display system according to the present exemplary embodiment. First, the explanatory variable display means 11 extracts an explanatory variable to be used as a condition, from the classification model (step S11). Subsequently, the explanatory variable display means 11 displays the extracted explanatory variable in association with any of the dimensional axes of the multi-dimensional space in which the prediction value is displayed (step S12).

The prediction value display means 12 specifies a prediction formula that corresponds to the position in the multi-dimensional space, specified by each of the explanatory variables associated with the dimensional axis (step S13). Subsequently, the prediction value display means 12 displays the prediction value calculated on the basis of the specified prediction formula, at a corresponding position in the multi-dimensional space (step S14).

The space display means 13 displays the multi-dimensional space that corresponds to the position in which the prediction value is displayed, in a mode that corresponds to the prediction formula used for calculating the prediction value (step S15).

As described above, in the present exemplary embodiment, the explanatory variable display means 11 extracts the explanatory variable from the classification model and displays the explanatory variable in association with any of the dimensional axes in the multi-dimensional space, while the prediction value display means 12 specifies the component that corresponds to a position in the multi-dimensional space specified by each of the explanatory variables associated with the dimensional axis, and displays the prediction value calculated on the basis of the specified component, on the same position. Subsequently, the space display means 13 displays the multi-dimensional space that corresponds to the position in which the prediction value is displayed, in the mode that corresponds to the component used for calculating the prediction value. This configuration makes it possible to visualize the trend of a prediction result corresponding to the parameter to be set.

Next, a modification example of the present exemplary embodiment will be described. The above-described exemplary embodiment illustrates a method by which the prediction value display means 12 displays the prediction value in the multi-dimensional space. Note that, with the presence of an actual measurement value (hereinafter, referred to as measurement value) such as learning data and measurement data, the prediction value display means 12 may display the measurement value instead of the prediction value, in the multi-dimensional space.

At this time, the prediction value display means 12 displays the measurement value in a mode different from the mode of the prediction value. The prediction value display means 12 may display the measurement value in red texts and display the prediction value in black texts, for example. Moreover, the prediction value display means 12 may display the measurement value in a bright color and display the prediction value in a dark color. Mode of display is arbitrary and not limited to the description above.

As in the present modification example, the prediction value display means 12 displays the measurement value in the multi-dimensional space, in a mode different from the mode of the prediction value, making it possible to further accurately visualize the trend of the prediction result corresponding to the parameters to be set.

Second Exemplary Embodiment

Figure 6:
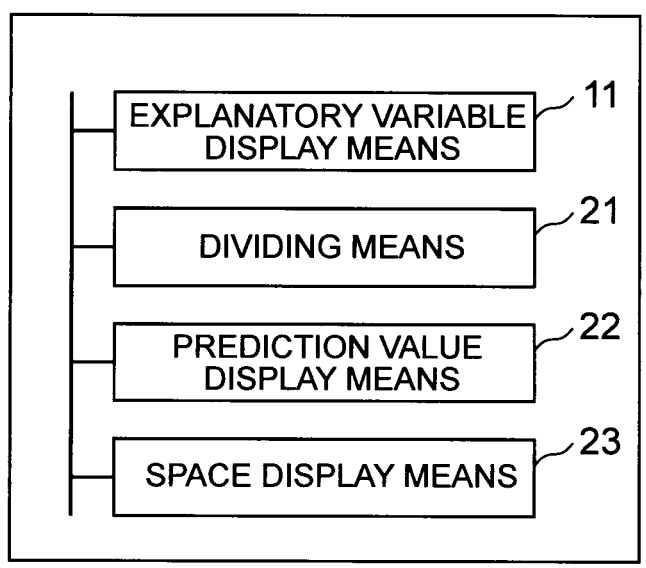
FIG. 6 It depicts a block diagram illustrating exemplary configuration of the prediction result display system according to a second exemplary embodiment of the present invention.

FIG. 6 is a block diagram illustrating an exemplary configuration of a prediction result display system according to a second exemplary embodiment of the present invention. Note that same reference signs as in FIG. 1 are given to the configuration similar to the configuration of the first exemplary embodiment, and description will be omitted. The prediction result display system according to the present exemplary embodiment includes an explanatory variable display means 11, a dividing means 21, a prediction value display means 22, and a space display means 23.

That is, in comparison with the prediction result display system of the first exemplary embodiment, the prediction result display system according to the present exemplary embodiment further includes the dividing means 21, and includes the prediction value display means 22 and the space display means 23 instead of the prediction value display means 12, and the space display means 13, respectively. Details of the explanatory variable display means 11 are similar to the first exemplary embodiment.

The dividing means 21 divides the dimensional axis to which the explanatory variable is allocated, and divides the multi-dimensional space on the basis of the divided dimensional axis. Dividing width of the dimensional axis is determined arbitrarily. For example, the dividing means 21 may divide the dimensional axis with an interval instructed by the user, or may determine the interval of the dimensional axis in accordance with the display magnification for displaying the multi-dimensional space and may divide the dimensional axis using the determined interval. Moreover, the dividing means 21 may divide the dimensional axis with an interval predetermined for each of the explanatory variables.

The prediction value display means 22 displays a prediction value for each of regions of the divided multi-dimensional space. Specifically, the prediction value display means 22 specifies a prediction formula used for calculating the prediction value to be displayed in a region of the divided multi-dimensional space. Note that the explanatory variable on a division axis that corresponds to the divided multi-dimensional space has a fixed range. Accordingly, the prediction value display means 22 specifies the prediction formula using a predetermined value (for example, median) in a range of the explanatory variable divided on the dividing axis, for example.

The prediction value display means 22 specifies the prediction formula, and thereafter, calculates the prediction value by applying the explanatory variable value used in specifying the prediction formula. Subsequently, the prediction value display means 22 displays the calculated prediction value, in a corresponding region of the multi-dimensional space.

The space display means 23 displays these regions in a mode that corresponds to the component (prediction formula) used for calculating the prediction value of each of the regions. The space display means 23 may display, for example, a background of the divided region, in a mode that corresponds to the prediction formula.

The explanatory variable display means 11, the dividing means 21, the prediction value display means 22, and the space display means 23 are implemented by the CPU of the computer that operates in accordance with the program (prediction result display program). Each of the explanatory variable display means 11, the dividing means 21, the prediction value display means 22, and the space display means 23 may be implemented by dedicated hardware.

Next, operation of the prediction result display system according to the present exemplary embodiment will be described. FIG. 7 is a flowchart illustrating exemplary operation of the prediction result display system according to the present exemplary embodiment. Processing in steps S11 to S12, that is, processing from extracting the explanatory variable to associating the explanatory variable with the dimensional axis, is similar to the processing illustrated in FIG. 5.

The dividing means 21 divides the dimensional axis and divides the multi-dimensional space on the basis of the divided dimensional axis (step S21). The prediction value display means 22 displays a prediction value for each of regions of the divided multi-dimensional space (step S22). Subsequently, the space display means 23 displays the multi-dimensional space in a mode that corresponds to the prediction formula used for calculating the prediction value (step S23).

As described above, in the present exemplary embodiment, the dividing means 21 divides the dimensional axis and divides the multi-dimensional space on the basis of the divided dimensional axis. Subsequently, the prediction value display means 22 displays the prediction value for each of the regions of the divided multi-dimensional space, while the space display means 23 displays the multi-dimensional space in a mode that corresponds to the component used for calculating the prediction value.

In this manner, the present exemplary embodiment is configured to perform calculation and display of the prediction value, or the like, for each of the regions, and thus, it is possible to reduce the amount of calculation needed for processing in addition to achieving the effects of the first exemplary embodiment.

Note that, also in the prediction result display system according to the present exemplary embodiment, as indicated by the modification example of the first exemplary embodiment, in a case where the measurement value that corresponds to each of the region is present, the prediction value display means 22 may display the measurement value in the multi-dimensional space in a mode different from the mode of the prediction value. Note that in a case where a plurality of measurement values that corresponds to each of the regions is present, the prediction value display means 22 may display the measurement value on the basis of a predetermined method (for example, by displaying the mean value, displaying all the measurement values). Such a configuration makes it possible to further accurately visualize the trend of the prediction result corresponding to the parameter to be set.

Next, a specific example of the present exemplary embodiment will be described. In the following specific example, a case where the prediction value is displayed in a two-dimensional table format will be described. Moreover, the following specific example is a case of predicting a result of production of confectionery, in which the objective variable includes 10 levels of hardness (toughness) of the confectionery. Moreover, it is assumed that the hardness of confectionery "5" represents the optimum hardness.

FIG. 8 is a diagram illustrating exemplary learning data used in the present specific example. In the example illustrated in FIG. 8, the degree of hardness/toughness is defined as the objective variable, while the dough rest time, the baking time, or the like, are defined as the explanatory variables.

Moreover, FIG. 9 is a diagram illustrating an exemplary classification model used in the present specific example. The example illustrated in FIG. 9 indicates that four prediction formulas (prediction formulas 1 to 4) used in the designing of confectionery are classified by explanatory variable. In the following description, it is assumed that the content within the range surrounded by the broken line in FIG. 9 is visualized.

The range surrounded by the broken line in FIG. 9 includes two explanatory variables, namely, "dough rest time" and "baking time". Accordingly, the explanatory variable display means 11 extracts the two explanatory variables and displays the explanatory variables in association with the explanatory variables in each of X-axis and Y-axis directions.

Next, the dividing means 21 divides the "dough rest time" and the "baking time" associated with each of the axes, with a predetermined interval. FIG. 10 is a diagram illustrating an exemplary division of a table by allocating the explanatory variable to each of the axes. In the present specific example, it is assumed that the dough rest time is within a range up to six hours, and the time interval is one hour. Similarly, in the present specific example, it is assumed that the baking time range is 150° C. to 220° C. and the temperature pitch is 10° C.

Next, the prediction value display means 22 specifies a prediction formula used for calculating the prediction value to be displayed in a region of the divided multi-dimensional space. The present specific example uses a median of each of the divided axes. The prediction value display means 22 specifies the prediction formula, and thereafter, calculates the prediction value by applying the explanatory variable value used in specifying the prediction formula. Subsequently, the prediction value display means 22 displays the calculated prediction value in a corresponding region.

FIG. 11 is a diagram illustrating an exemplary display of a prediction value and a measurement value in each of the regions. In a case where the measurement value that corresponds to the divided region is present, the prediction value display means 22 may display the measurement value together with or instead of the prediction value. For example, as illustrated in FIG. 11, the prediction value display means 22 may display the prediction value without an underline and may display the measurement value with the underline.

Next, the space display means 23 displays the multi-dimensional space in a mode that corresponds to the prediction formula used for calculating the prediction value. FIG. 12 is a diagram illustrating an exemplary display of the multi-dimensional space in accordance with the prediction formula. In an example illustrated in FIG. 9, prediction formula 2 is used in a case where the dough rest time is below two hours, prediction formula 3 is used in a case where the dough rest time is two hours or more and the baking temperature is below 170° C., and prediction formula 4 is used in a case where the baking temperature is 170° C. or above. Accordingly, the space display means 23 displays a background of the multi-dimensional space in a mode enabling identification of each of the prediction formulas, as illustrated in FIG. 12.

In the example illustrated in FIG. 12, the hardness of confectionery "5" assumed to be the optimum hardness is concentrated on the baking temperature range of 170° C. to 200° C., and the dough rest time range of two hours to four hours. Accordingly, the designer can grasp that it is preferable to perform production using the value in these ranges.

That is by displaying the prediction value and the prediction formula as illustrated in FIG. 12, the designer can reduce the cost needed for designing in proceeding with new development. Specifically, it is possible to reduce a development cycle of repeating designing, prototyping, and test, and thus, to achieve higher efficiency in the development. Furthermore, by displaying the prediction value and the prediction formula in association with each other, it is possible to discover the difference in trend that has not been found before.

Moreover, this enables the designer to grasp a marginal portion in a trend change, making it possible to easily adjust parameters and to perform parameter setting that avoids this marginal portion or targeting this marginal portion.

Third Exemplary Embodiment

Next, the prediction result display system according to a third exemplary embodiment of the present invention will be described. For example, it is assumed that the prediction result display system of the second exemplary embodiment is used for parameter adjustment to predict a certain objective variable value. At this time, there might be a case where another objective variable value in the use of the same parameter needs to be viewed. Accordingly, in the present exemplary embodiment, a method for displaying the multi-dimensional space and changing the content displayed in the multi-dimensional space while maintaining the multi-dimensional space divided in the second exemplary embodiment, will be described.

FIG. 13 is a block diagram illustrating an exemplary configuration of a prediction result display system according to the third exemplary embodiment of the present invention. Note that same reference signs as in FIG. 6 are given to the configuration similar to the configuration of the second exemplary embodiment, and description of overlapping processing will be omitted. The prediction result display system according to the present exemplary embodiment includes an explanatory variable display means 11, the dividing means 21, the prediction value display means 22, the space display means 23, and a model input means 24. That is, the prediction result display system according to the present exemplary embodiment differs from the prediction result display system according to the second exemplary embodiment in that it further includes the model input means 24.

After the space display means 23 displays the prediction value in the multi-dimensional space, the model input means 24 inputs a new classification model on the basis of user's instruction, for example. In the prediction formula classified by the classification model input into the model input means 24 in the present exemplary embodiment, the objective variable calculated as the prediction value is also represented by the linear sum of the explanatory variable, similarly to the case of the first exemplary embodiment.

The prediction value display means 22 specifies the prediction formula used for calculating the prediction value to be displayed in the region of the already divided multi-dimensional space on the basis of the input classification model, and calculates the prediction value by applying the explanatory variable value that has been used for specifying the prediction formula. Subsequently, the prediction value display means 22 displays the calculated prediction value, in a corresponding region of the multi-dimensional space. The space display means 23 displays these regions in a mode that corresponds to the prediction formula used for calculating the prediction value of each of the regions.

The prediction value display means 22 may display the prediction value for a new objective variable after deleting information on the prediction value and the prediction formula already displayed. Alternatively, the prediction value display means 22 may display a prediction value for a new objective variable in a separate display region while retaining information on the prediction value and the prediction formula already displayed.

FIG. 14 is a diagram illustrating another exemplary display of the multi-dimensional space in accordance with the prediction formula. The example illustrated in FIG. 14 assumes that the objective variable represents the sweetness of the confectionery in 10 levels, in which the sweetness of the confectionery "5" represents optimum sweetness. In contrast to the table illustrated in FIG. 12, divided content of the multi-dimensional space to be displayed is the same while the content of the objective variables (that is, prediction values) displayed are different from each other.

For example, on the table illustrated in FIG. 12, the hardness is appropriate when the baking temperature is in a range of 170° C. to 200° C. and the dough rest time is in a range of two hours to four hours. In contrast, on the table illustrated in FIG. 14, also the sweetness is appropriate when the baking temperature is in a range of 190° C. to 200° C., and the dough rest time is in a range of two hours to four hours, among the above-described ranges.

FIG. 15 is a diagram illustrating an exemplary parameter adjustment in consideration of a change in the performance value. In consideration of controllability at the time of production, the parameter distant from the marginal portion can hold the trend of the performance value with less change and can suppress a failure. Specifically, in the example illustrated in FIG. 15, when comparing the two ranges with the same sweetness "5", the range with the baking temperature of 190° C. to 200° C. and the dough rest time of three hours to four hours is apparently more distant from the marginal portion, than the range with the dough rest time of two hours to three hours. With such displays, the designer can preferentially select, for example, the range distant from the marginal portion.

As described above, in the present exemplary embodiment, the prediction value display means 22 specifies the prediction formula used for calculating the prediction value to be displayed in the region of the divided multi-dimensional space, on the basis of the input classification model, and calculates the prediction value by applying the explanatory variable that has been used for specifying the prediction formula. Subsequently, the prediction value display means 22 displays the calculated prediction value in the region in the corresponding multi-dimensional space, while the space display means 23 displays these regions in a mode that corresponds to the prediction formula used for calculating the prediction value of each of the regions. This configuration makes it possible to easily grasp the effects of set parameters on other objective variables, in addition to obtaining effects of the first and second exemplary embodiments.

Fourth Exemplary Embodiment

Next, the prediction result display system according to a fourth exemplary embodiment of the present invention will be described. The first exemplary embodiment describes an exemplary case where the value of the explanatory variable other than the extracted explanatory variable is set as a fixed value when the prediction formula is specified and the prediction value is calculated. The present exemplary embodiment describes a configuration in which the value of the explanatory variable other than the extracted explanatory variable is input.

FIG. 16 is a block diagram illustrating an exemplary configuration of the prediction result display system according to the fourth exemplary embodiment of the present invention. Note that same reference signs as in FIG. 6 are given to the configuration similar to the configuration of the second exemplary embodiment, and description will be omitted. The prediction result display system according to the present exemplary embodiment includes an explanatory variable display means 11, the dividing means 21, the prediction value display means 22, the space display means 23, and an explanatory variable input means 25.

That is, the prediction result display system according to the present exemplary embodiment differs from the prediction result display system according to the second exemplary embodiment in that it further includes the explanatory variable input means 25. The other configuration is similar to the configuration of the second exemplary embodiment. Note that the prediction result display system according to the present exemplary embodiment may include the model input means 24 exemplified in the third exemplary embodiment.

The explanatory variable input means 25 inputs the value of the explanatory variable other than the explanatory variable extracted by the explanatory variable display means 11. The prediction value display means 22 specifies the prediction formula and calculates the prediction value using the input explanatory variable value.

FIG. 17 is a block diagram illustrating an exemplary screen for inputting an explanatory variable value. The example illustrated in FIG. 17 includes a region 50 for inputting the value of the explanatory variable other than the extracted explanatory variables, namely, "dough rest time" and "baking time". For example, when the designer inputs the explanatory variable value into an input field 51, the prediction value display means 22 specifies the prediction formula and calculates the prediction value using the input explanatory variable value.

Note that input of the explanatory variable is not limited to the case of directly inputting the value. That is, as illustrated in FIG. 17, it is allowable to specify the explanatory variable value by shifting a bar 52 provided for changing the value.

As described above, in the present exemplary embodiment, the prediction value display means 22 specifies the prediction formula and calculates the prediction value using the explanatory variable value input by the explanatory variable input means 25. This enables the designer to make designs in consideration of the parameters other than the extracted explanatory variable.

Hereinabove, the prediction result display system according to the present invention has been described using specific examples. However, the content of the prediction result displayed by the prediction result display system according to the present invention is not limited to confectionery production results. Application is possible also to various situations such as agricultural products growing results and industrial product manufacturing results, other than the confectionery production results.

In a case of predicting the growing result of the agricultural products, it is allowable to set, for example, the sweetness and water content (%) as the objective variable, and set the amount of sunshine, fertilizer (nitrogen, phosphorus, and potassium), the amount of water supplied, earth formulation ratio, and the harvest time, as the explanatory variable. In another case of predicting the production result of an industrial product, it is allowable to set, power consumption (wattage), brightness, yield, or the like, as the objective variable, and set the temperature, humidity, mercury quantity, the moving speed of belt conveyor, steam pressure, or the like, as the explanatory variable. In this manner, the prediction result display system according to the present invention can be applied to various fields.

Figure 18:
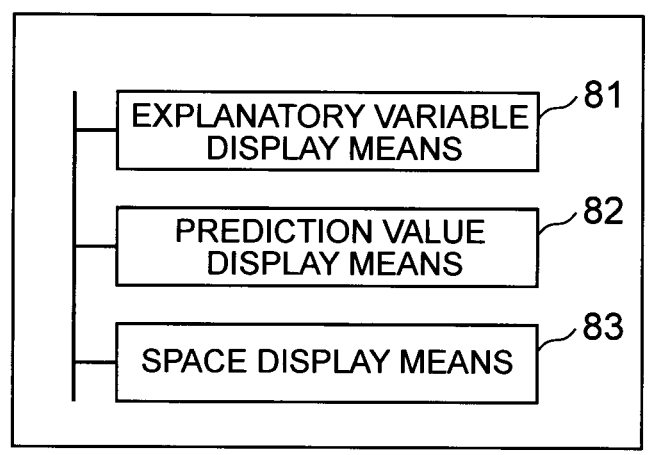
FIG. 18 It depicts a block diagram illustrating a summary of the prediction result display system according to the present invention.

Next, a summary of the present invention will be described. FIG. 18 is a block diagram illustrating the summary of the prediction result display system according to the present invention. A prediction result display system according to the present invention is used in a prediction system configured to calculate a prediction value by applying input data to a component (e.g., prediction formula). The prediction result display system includes an explanatory variable display means 81, a prediction value display means 82, and a space display means 83. The explanatory variable display means 81 (e.g., explanatory variable display means 11) extracts an explanatory variable used as a condition from a classification model classified by the condition for selecting the component used for prediction and displays the explanatory variable in association with any of dimensional axes of a multi-dimensional space in which the prediction value is displayed. The prediction value display means 82 (e.g., prediction value display means 12) specifies the component that corresponds to a position in a multi-dimensional space, specified by each of the explanatory variables associated with the dimensional axis, and displays the prediction value calculated on the basis of the specified component, on the same position. The space display means 83 (e.g., space display means 13) displays the multi-dimensional space that corresponds to the position in which the prediction value is displayed, in a mode that corresponds to the component used for calculating the prediction value.

This configuration makes it possible to visualize the trend of the prediction result corresponding to the parameter to be set.

Moreover, the prediction result display system may include a dividing means (e.g., dividing means 21) that divides the dimensional axis and divides the multi-dimensional space on the basis of the divided dimensional axis. Subsequently, the prediction value display means 82 (e.g., the prediction value display means 22) may display the prediction value for each of the regions of the divided multi-dimensional space, while the space display means 83 (for example, the space display means 23) may display the region of the divided multi-dimensional space in a mode according to the component used for calculating the prediction value. This configuration enables reduction of the amount of calculation needed for processing.

Moreover, the prediction value display means 82 may specifies the prediction formula used for calculating the prediction value to be displayed in the region of the divided multi-dimensional space on the basis of the newly input classification model and may display the prediction formula calculated by application of the value of the explanatory variable used for specifying the prediction formula, in the region of the corresponding multi-dimensional space. Subsequently, the space display means 83 may display the regions of the divided multi-dimensional space in a mode that corresponds to the prediction formula used for calculating the prediction value of each of the regions. This configuration makes it possible to easily grasp the effects of set parameters on other objective variables.

Specifically, the dividing means may divide each of the dimensional axes in the two-dimensional space and may divide the two-dimensional space on the basis of the divided dimensional axis. Subsequently, the prediction value display means 82 may display the prediction value for each of the regions in the table format, while the space display means 83 may display the background of the divided region in a mode that corresponds to the component used for calculating the prediction value. In this manner, by displaying the prediction value and the prediction formula in the table format, it is possible to visualize the trend of prediction result in a mode with enhanced visibility for the designer.

Moreover, the prediction value display means 82 may display the corresponding measurement value in a mode (e.g., red texts, underline, or the like) different from the prediction value at a position in the multi-dimensional space specified by each of the explanatory variables associated with the dimensional axis. Such a configuration makes it possible to further accurately visualize the trend of the prediction result corresponding to the parameter to be set.

Moreover, the prediction value display means 82 may specify the component on the basis of the input of the value of the explanatory variable other than the explanatory variable extracted by the explanatory variable display means 81 (for example, input into the explanatory variable input means 25). This configuration enables the designer to perform designing in consideration of the parameters other than the extracted explanatory variable.

While the invention of the present application has been described with reference to the exemplary embodiments and examples, the invention of the present application is not limited to the above embodiments and examples. Configuration and details of the invention of the present application can be modified in various manners understandable for those skilled in the art within the scope of the invention of the present application.

This application is based upon and claims the benefit of priority from U.S. Provisional Application No. 62/108,618 filed Jan. 28, 2015, the disclosure of which is incorporated herein in its entirety by reference.

INDUSTRIAL APPLICABILITY

The present invention is suitably applied to a prediction result display system that displays various prediction results.

REFERENCE SIGNS LIST

11 Explanatory variable display means
12, 22 Prediction value display means
13, 23 Space display means
21 Dividing means
24 Model input means
25 Explanatory variable input means

What is claimed is:

1. A prediction result display system used in a prediction system configured to calculate a prediction value by applying input data to two or more components, the prediction result display system comprising:
  a hardware processor configured to execute a software code to:
    extract an explanatory variable used as a condition from a classification model classified by the condition for selecting the two or more components used for prediction and display the explanatory variable in association with any of dimensional axes of a multi-dimensional space in which the prediction value is displayed;
  specify the two or more components that correspond to a position in a multi-dimensional space specified by each of the explanatory variables associated with the dimensional axis, calculate the prediction value by applying each of the explanatory variables to the specified two or more components, and display the prediction value calculated based on each of the specified two or more components, on the same position; and
    display the multi-dimensional space that corresponds to the position in which the prediction value is displayed, in a mode that corresponds to the each of the two or more components used for calculating the prediction value.

2. The prediction result display system according to claim 1, wherein the hardware processor is further configured to:
  divide the dimensional axis and divide the multi-dimensional space based on the divided dimensional axis,
  display the prediction value for each of regions of the divided multi-dimensional space, and
  display the region of the divided multi-dimensional space in a mode that corresponds to the two or more components used for calculating the prediction value.

3. The prediction result display system according to claim 2, wherein the hardware processor is further configured to:
  specify a prediction formula used for calculating the prediction value to be displayed in the region of the already divided multi-dimensional space based on a newly input classification model, and display the prediction formula calculated by application of the value of the explanatory variable used for specifying the prediction formula, in the region of the corresponding multi-dimensional space, and
  display the region of the divided multi-dimensional space in a mode that corresponds to the prediction formula used for calculating the prediction value for each of the regions.

4. The prediction result display system according to claim 2, wherein the hardware processor is further configured to:
  divide each of the dimensional axes in a two-dimensional space and divides the two-dimensional space into a table format based on, the divided dimensional axis,
  display the prediction value for each of regions of the divided table format, and
  display a background of the divided region in a mode that corresponds to the two or more components used for calculating the prediction value.

5. The prediction result display system according to claim 1, wherein the hardware processor is further configured to display a corresponding measurement value in a mode different from the mode of the prediction value, on a position in the multi-dimensional space specified by each of the explanatory variables associated with the dimensional axis.

6. The prediction result display system according to claim 1, wherein the hardware processor is further configured to specify the two or more components based on the input of the value of the explanatory variable other than the explanatory variable extracted by the explanatory variable display unit.

7. A prediction result display method used in a prediction system configured to calculate a prediction value by applying input data to two or more components, the prediction result display method comprising:
  extracting an explanatory variable used as a condition from a classification model classified by the condition for selecting the two or more components used for prediction and displaying the explanatory variable in association with any of dimensional axes of a multi-dimensional space in which the prediction value is displayed;
  specifying the two or more components that correspond to a position in a multi-dimensional space specified by each of the explanatory variables associated with the dimensional axis calculating the prediction value by applying each of the explanatory variables to the specified two or more components and displaying the prediction value calculated based on each of the specified two or more components, on the same position; and
  displaying the multi-dimensional space that corresponds to the position in which the prediction value is displayed, in a mode that corresponds to the two or more components used for calculating the prediction value.

8. The prediction result display method according to claim 7, further comprising:
  dividing the dimensional axis;
  dividing the multi-dimensional space based on the divided dimensional axis;
  displaying the prediction value for each of regions of the divided multi-dimensional space; and displaying the region of the divided multi-dimensional space in a mode that corresponds to the two or more components used for calculating the prediction value.

9. A non-transitory computer readable information recording medium storing a prediction result display program, when executed by a processor, that performs a method for:
- extracting an explanatory variable used as a condition from a classification model classified by the condition for selecting two or more components used for prediction and displaying the explanatory variable in association with any of dimensional axes of a multi-dimensional space for displaying the prediction value;
- specifying the two or more components that correspond to a position in a multi-dimensional space specified by each of explanatory variables associated with the dimensional axis, calculating the prediction value by applying each of the explanatory variables to the specified two or more components, and displaying the calculated prediction value based on each of the specified two or more components, on the same position; and
- displaying the multi-dimensional space that corresponds to the position in which the prediction value is displayed, in a mode that corresponds to the component used for calculating the prediction value.

10. The non-transitory computer readable information recording medium according to claim 9,
- dividing the dimensional axis and dividing the multi-dimensional space based on the divided dimensional axis,
- displaying the prediction value for each of regions of the divided multi-dimensional space, and
- displaying the region of the divided multi-dimensional space in a mode that corresponds to the component used for calculating the prediction value.

11. The prediction result display system according to claim 1, wherein the hardware processor is further configured to:
- receive an input of a value of a second explanatory variable other than the extracted explanatory variable, the value of the second explanatory variable input by shifting of a bar for changing the value displayed on a display device, and
- specify the prediction formula and calculates the prediction value using the input second explanatory variable value.

\* \* \* \* \*